US009168779B2

(12) United States Patent
Krapf et al.

(10) Patent No.: US 9,168,779 B2
(45) Date of Patent: Oct. 27, 2015

(54) MAGNETICALLY SUPPORTED CLIPBOARD HAVING DRY-ERASABLE WRITING SURFACE

(71) Applicant: INTELPROPOLIST LLC, Macedon, NY (US)

(72) Inventors: Christian Q. Krapf, Rochester, NY (US); Artem G. Sivak, Rochester, NY (US); Dana Castronova, Bloomfield, NY (US)

(73) Assignee: W.A. Krapf, Inc., Macedon, NY (US)

( * ) Notice: Subject to any disclaimer, the term of this patent is extended or adjusted under 35 U.S.C. 154(b) by 182 days.

(21) Appl. No.: 13/956,772

(22) Filed: Aug. 1, 2013

(65) Prior Publication Data

US 2015/0034799 A1 Feb. 5, 2015

(51) Int. Cl.
*B43L 1/00* (2006.01)
*B42F 9/00* (2006.01)
*F16M 13/02* (2006.01)
*B43K 23/00* (2006.01)
*B43L 3/00* (2006.01)

(52) U.S. Cl.
CPC .............. *B42F 9/002* (2013.01); *B43K 23/001* (2013.01); *B43L 1/00* (2013.01); *B43L 1/008* (2013.01); *B43L 3/00* (2013.01); *B43L 3/008* (2013.01); *F16M 13/022* (2013.01)

(58) Field of Classification Search
CPC ......... B42D 5/006; C04B 28/02; B42F 9/001; B43L 1/008
USPC .................................... 248/309.4, 206.5, 683
See application file for complete search history.

(56) References Cited

U.S. PATENT DOCUMENTS

| | | |
|---|---|---|
| 2,850,296 A | 9/1958 | Ratliff |
| 2,862,328 A | 12/1958 | Wadsworth |
| 3,922,973 A | 12/1975 | Sturgeon |
| 3,977,744 A | 8/1976 | DeWitt |
| 4,105,182 A | 8/1978 | Jacobson |
| 4,121,637 A | 10/1978 | Jennings |
| 4,153,927 A | 5/1979 | Owens |
| 4,274,567 A | 6/1981 | Sawyer |
| D261,903 S | 11/1981 | Mulder |
| 4,577,788 A | 3/1986 | Richardson |
| 4,619,386 A | 10/1986 | Richardson |
| 4,623,276 A | 11/1986 | Kinneir |
| 4,630,769 A | 12/1986 | Ball |
| 4,832,369 A | 5/1989 | Johnson et al. |
| 4,832,569 A | 5/1989 | Samuelsen et al. |
| 4,892,334 A | 1/1990 | Sinclair |
| D308,542 S | 6/1990 | De Witt |
| D315,456 S | 3/1991 | Couch et al. |
| 5,004,106 A | 4/1991 | Blumstock et al. |
| D322,891 S | 1/1992 | Samuelson et al. |

(Continued)

FOREIGN PATENT DOCUMENTS

| | | |
|---|---|---|
| WO | WO 00/49919 | 8/2000 |
| WO | WO 2006/019691 A2 | 2/2006 |

*Primary Examiner* — Jeanette E Chapman
*Assistant Examiner* — Daniel Kenny
(74) *Attorney, Agent, or Firm* — Barclay Damon, LLP (57) ABSTRACT

A clipboard is defined by a planar support having a back surface that retains at least one magnet, thereby permitting releasable attachment of the clipboard to a metallic supporting surface. A dry-erasable steel surface is secured to the front of the support and a hinge clip attached enables at least one paper to be secured to the front side of the clipboard as well as at least one magnet.

17 Claims, 9 Drawing Sheets

(56) References Cited

U.S. PATENT DOCUMENTS

| | | | |
|---|---|---|---|
| D324,399 S | 3/1992 | Murphy | |
| 5,092,507 A | 3/1992 | Szablak et al. | |
| 5,145,141 A | 9/1992 | Hunter | |
| 5,174,607 A * | 12/1992 | Hill | 281/45 |
| 5,226,215 A | 7/1993 | Evenson | |
| D341,626 S | 11/1993 | Rosmarin, Jr. et al. | |
| 5,297,814 A | 3/1994 | Peters | |
| 5,324,076 A | 6/1994 | Nieradka | |
| 5,339,950 A | 8/1994 | Li | |
| 5,441,228 A | 8/1995 | Geborek | |
| 5,607,223 A | 3/1997 | Brotz | |
| D379,477 S | 5/1997 | Shamoon | |
| 5,655,323 A | 8/1997 | Lassoff | |
| 5,658,014 A | 8/1997 | Barker et al. | |
| 5,702,115 A | 12/1997 | Pool | |
| D398,650 S | 9/1998 | Shamoon | |
| D418,877 S | 1/2000 | Brotz | |
| D428,927 S | 8/2000 | Chang | |
| 6,216,996 B1 | 4/2001 | Shamoon | |
| 6,234,535 B1 | 5/2001 | Roberts | |
| 6,367,642 B2 | 4/2002 | Kambouris et al. | |
| 6,637,774 B2 | 10/2003 | Gaska | |
| 6,672,622 B2 | 1/2004 | Barron | |
| D488,835 S | 4/2004 | Haruhiro | |
| D495,358 S | 8/2004 | Egmond | |
| D495,746 S | 9/2004 | Chen | |
| 6,846,090 B1 | 1/2005 | Smith | |
| 6,866,516 B2 | 3/2005 | Smith et al. | |
| 7,246,458 B2 * | 7/2007 | Ternovits et al. | 40/600 |
| 7,431,590 B2 | 10/2008 | Gerhardt | |
| 7,509,577 B2 | 3/2009 | Kuwata et al. | |
| 7,918,576 B2 | 4/2011 | Leanza | |
| 8,675,354 B2 * | 3/2014 | L'Henaff | 361/679.22 |
| 2001/0000901 A1 | 5/2001 | Kambouris et al. | |
| 2005/0112324 A1 | 5/2005 | Rosenbaum et al. | |

\* cited by examiner

MAGNETICALLY SUPPORTED CLIPBOARD HAVING DRY-ERASABLE WRITING SURFACE

TECHNICAL FIELD

The application relates generally to the field of display systems and more specifically to a clipboard that is magnetically and releasably attachable to metallic and non-metallic supporting surfaces and further includes a dry-erasable steel writing surface that permits adhesion by at least one magnet.

BACKGROUND

Clipboards are extremely useful accessories that have been widely used and adapted for a number of different business, industrial and institutional applications in which a portable writing surface is desired. Version of clipboards are presently known that enable a plurality of papers and similar materials to be retained and supported using a spring-loaded clip, which is typically found at the upper end of a front surface of the clipboard. Some clipboard versions are relatively complex and elaborate, including features such as drawers or other storage receptacles that enable the clipboard to be used in a manner akin to that of a miniature desk.

There may be occasions in which a conventional clipboard cannot be used, for example, when a supply of paper is not readily available. There may be other opportunities in which a clipboard could additionally be used as a display, for example, on an industrial plant floor. In addition and in at least some applications, there is a general need to provide a reliable means for supporting the clipboard but still permitting releasable attachment of same, as needed, such as for industrialized and/or business applications.

BRIEF DESCRIPTION

Therefore and according to one aspect, there is provided a clipboard comprising a planar support including a base, a dry-erasable front writing surface supported by the base and a hinge clip that enables at least one paper to be secured to the dry-erasable front surface. The base is defined by a back or rear surface that supports at least one magnet, permitting releasable attachment of the clipboard to a metallic supporting surface and wherein the dry-erasable writing surface permits adhesion by at least one magnet.

According to at least one embodiment, the base can include a plurality of recesses and/or holes to enable the clipboard to be more lightweight, but without sacrificing structural integrity. The at least one magnet can be supported within at least one slot or recess that is provided in the back surface of the base. According to at least one version, a magnet or series of magnets defined by a substantially T-shaped configuration that is fitted in a corresponding substantially T-shaped slot or recess provided in the back or rear surface of the base. The magnet(s) can be arranged such that a facing surface is substantially coplanar with the back surface of the base. According to at least one embodiment, the base can be made from a lightweight, but moldable plastic material.

A clip configured for supporting at least one writing implement, such as a dry-erase pen or other suitable utensil, can be provided on the clipboard according to at least one embodiment. In at least one version, the writing implement clip can be secured along a lateral side of the clipboard and disposed so as not to substantially interfere or otherwise block access to the front dry-erasable writing surface.

According to at least one embodiment, the clipboard can further include at least one mounting hole or fixture to permit the clipboard to be mountable, using at least one fastener, to non-metallic supporting surfaces, as needed. Advantageously, each of the supporting features enables use of the clipboard as a display in various environments, providing versatility in terms of application.

Another advantage is in further providing a clipboard having a dry erasable writing surface since this surface eliminates the absolute need for paper, adding to the versatility of the clipboard, such as for purposes of display and additionally permits attachment by magnets or other aids.

Other distinct advantages include those relating to efficiency in terms of manufacture and savings in cost of the clipboard, as well as simplicity in terms of assembly and use in addition to the above-noted versatility in several varied fields for industrial, institutional and educational applications.

These and other features and advantages will be readily apparent from the following Detailed Description, which should be read in conjunction with the accompanying drawings.

DETAILED DESCRIPTION

The following discussion relates to an exemplary embodiment of a clipboard having that enables releasability to metallic and non-metallic supporting surfaces and including a dry-erasable writing surface, which is made in accordance with the present invention. Throughout the course of discussion that follows, several terms are often used in order to provide a suitable frame of reference with regard to the accompanying drawings. These terms, which may include "top", "bottom", "upper", "lower", "distal", "proximal", "above", "below" and the like, are not intended to limit the scope of the invention, unless so expressly indicated herein.

Figure 1:
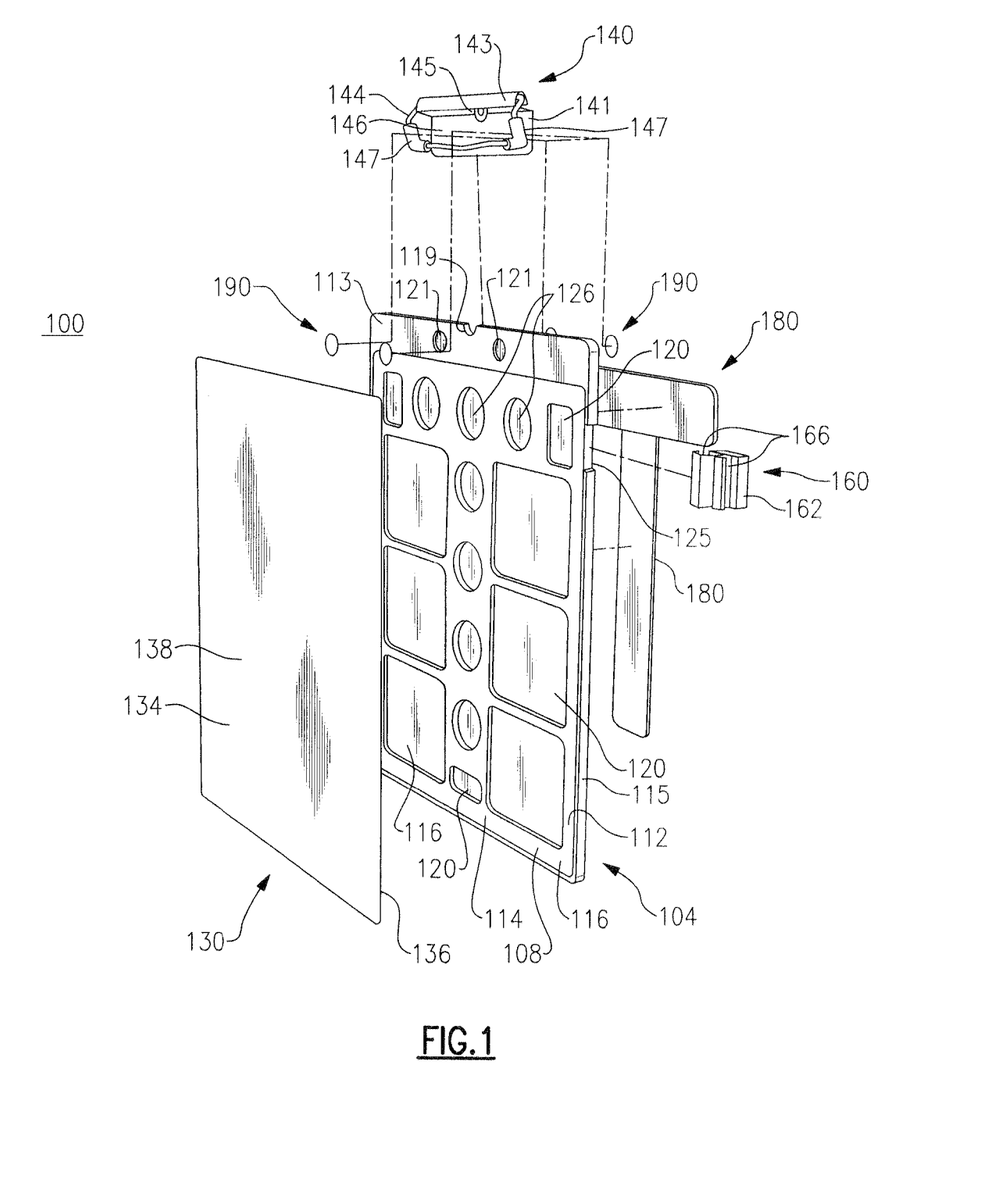
FIG. 1 is an exploded assembly view of a clipboard that has been made in accordance with an exemplary embodiment.

Referring to FIG. 1, there is shown an exploded assembly view of an exemplary clipboard 100, which is defined by a planar support in the form of a base or base member 104. The base 104 according to this specific embodiment is a unitary member having a substantially rectangular configuration including a front facing side or surface 108, an opposing rear facing side or surface 112, FIG. 2, as well as a top edge 113, a bottom edge 114 and opposing side or lateral edges 115. The thickness of the base 104 is substantially smaller than either the length or width dimensions thereof. According to this specific embodiment, the base 104 is approximately 18.375 inches in height, approximately 12.350 inches in width and approximately 0.250 inches in thickness. These dimensions are exemplary, as previously noted, and can easily be varied depending on the application or use. According to this exemplary embodiment, the base 104 can be fabricated as a single section of a suitable plastic material, such as ABS, acetal and a variety of other moldable plastics. It will be appreciated from the following discussion, however, that the base 104 can be fabricated from one or a combination of other suitable durable and rigid materials, such as fiberboard or a stiffened, corrugated cardboard, lightweight metals (e.g., aluminum) and wood.

The front facing surface 108 of the base 104 is further defined by a first recess 116 as well as a plurality of second recesses 120. According to this exemplary embodiment, the first recess 116 covers literally the entirety of the front facing side 108 of the base 104 with the exception of a peripheral edge comprising the top edge 113, bottom edge 114 and opposing lateral edges 115 of the base 104. Based on the rectangular configuration of the base 104, the first recess 116 is also herein defined by a rectangular configuration and is dimensioned to receive a front panel 130. The top edge 113 has increased surface area, as compared to the bottom edge 114 and lateral edges 115, and includes a small notch 119 formed at the outer periphery in approximately the center line of the base 104. A pair of holes 121 extending through the base 104 are additionally provided according to this exemplary embodiment within the top edge 113 of the front facing side 108 adjacent the notch 119 and on opposing sides thereof, relative to the center line of the base 104.

Figure 2:
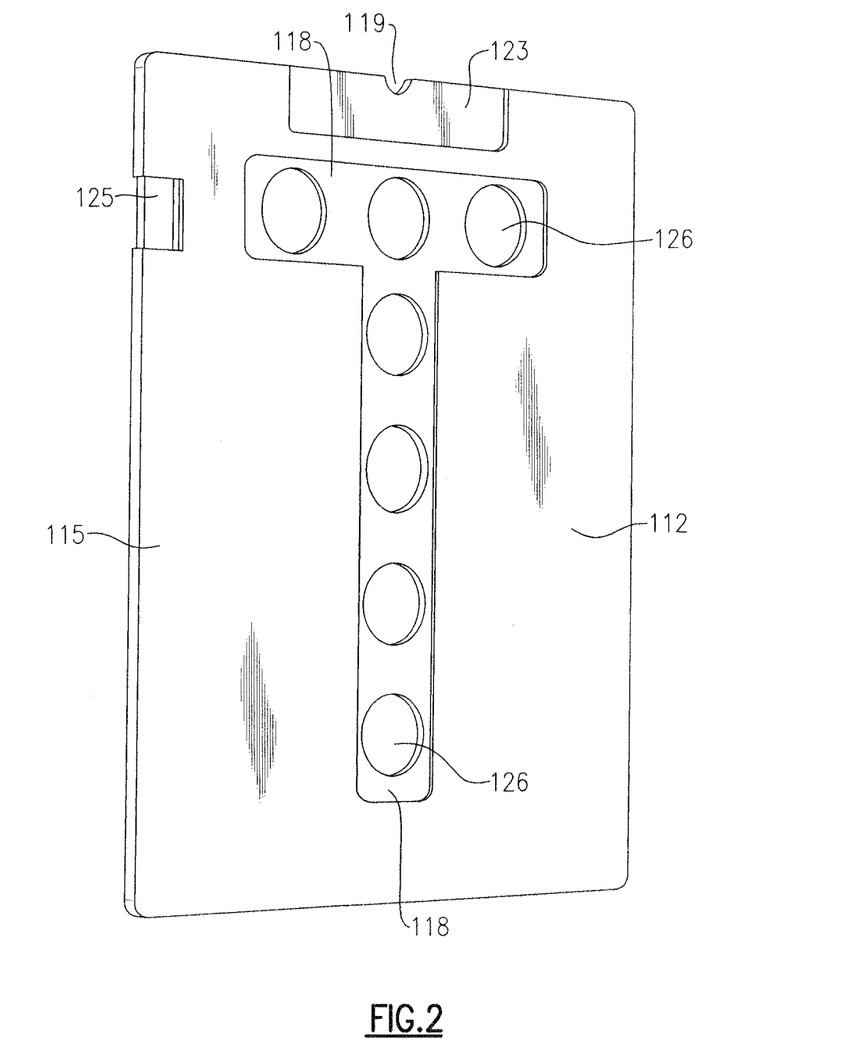
FIG. 2 is a rear facing view of an exemplary base of a clipboard, such as depicted according to FIG. 1.

The plurality of second recesses 120 is similarly provided on the front facing surface 108 of the base 104 and extend further inwardly toward the rear facing side 112, FIG. 2, of the base 104 than the first recess 116. Several of the second recesses 120 according to this specific embodiment are also substantially rectangular in shape and evenly spaced along the front facing side 108 surrounding a set of openings 126 or holes extending entirely through the thickness of the base 104. In this embodiment, the set of openings 126 is provided in a substantially T-shaped configuration consisting of a vertical column of openings 126 extending along the centerline of the base 104 and an upper row of openings 126 disposed adjacent to the top edge 113. According to this specific embodiment, a total of seven (7) openings 126 are provided with each opening 126 having a diameter of approximately 0.125 inches, although the size and number of openings 126 is mainly exemplary for purposes of the herein described embodiment. Another plurality of second recesses 120 are defined laterally of the upper row of openings 126, with yet another second recess 120 being disposed beneath the column of openings 126 adjacent the bottom edge 114. The second recesses 120 extend inwardly approximately 0.1 inches, wherein the purposes of the second recesses 120 and the openings 126 is to remove excess weight of the overall structure, but without significantly reducing the structural integrity thereof. Other suitable configurations for this latter purpose can easily be contemplated by one of sufficient skill.

As shown more clearly in FIG. 2, the rear facing surface 112 of the base 104 includes a recessed and substantially T-shaped slot or recess 118 that is disposed, according to this exemplary version, about the openings 126. It should be noted that the through holes 121 are not illustrated in this particular view. The substantially T-shaped slot 118 is sized to retain a magnet 180, FIG. 1, that is also according to this embodiment shaped in a substantially T-shaped configuration to fit conveniently within the slot 118. An additional recess 123 is provided in a top area of the rear facing surface 112 along with yet another recess 125 being formed within an intermediate portion of a lateral edge 115, the latter recess 125 extending to the rear facing side 112 as shown in FIGS. 1 and 2, in which a slot 124 is further defined adjacent a leading interior edge of the recess 125.

Referring back to FIG. 1, the front panel 130 is made from a unitary section of steel that is sized to entirely fit within the first recess 116 of the base 104, the front panel 130 having substantially the same outer dimensions in terms of its length and width. The depth of the first recess 116 is also sized in accordance with this embodiment such that a facing surface of the front panel 130 to be substantially coplanar with the top, bottom and lateral edges 113, 114, 115, when the panel 130 is assembled to the base 104.

The steel front panel 130 is defined by a front facing side 134 and an opposing planar front facing side 136. The front facing side 134 is further provided with a dry-erasable writing surface 138, such as those commercially available from Magnatag Vision Systems, of Macedon N.Y., among others such as those produced under the tradename of Whitewalls and/or substrates having coatings as described, for example, in WO 2006/019691A2. The '691 patent is herein incorporated by reference in its entirety. According to this exemplary version, the entire front facing side 134 is provided with a dry-erasable writing surface 138. According to other versions, it may be preferred that only a portion of the front facing side 134 of the front panel 130 be provided with a dry-erasable writing surface 138. The surface 138 can be provided as a so-called "white-board" or can include designs imprinted thereon, such as through use of dye-sublimation, silk screening or other suitable manufacturing processes. The surface 138 enables the imprinting, for example, of graphs, maps and the like and further permits the attachment of magnets, guides, lettering or other forms of indicia (not shown).

Figure 9:
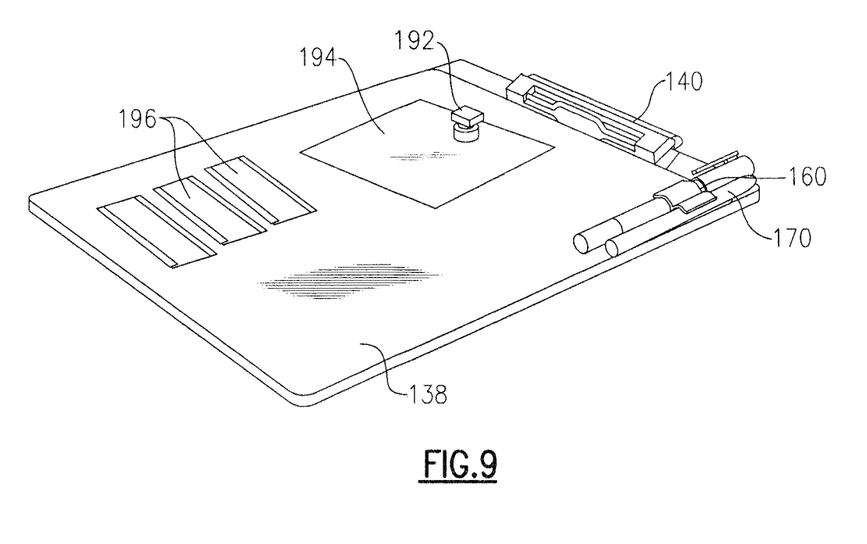
FIG. 9 is a front perspective view of a clipboard according to an exemplary embodiment in accordance with the present invention.
Figure 10A:
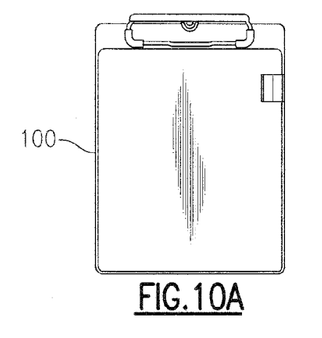
FIGS. 10A-10D illustrate a plurality of alternative clipboard designs in accordance with the present invention.
Figure 10B:
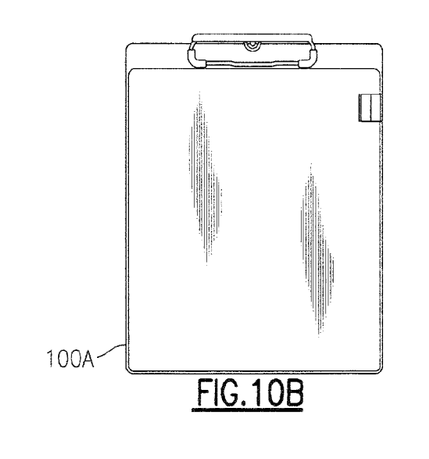
Figure 10C:
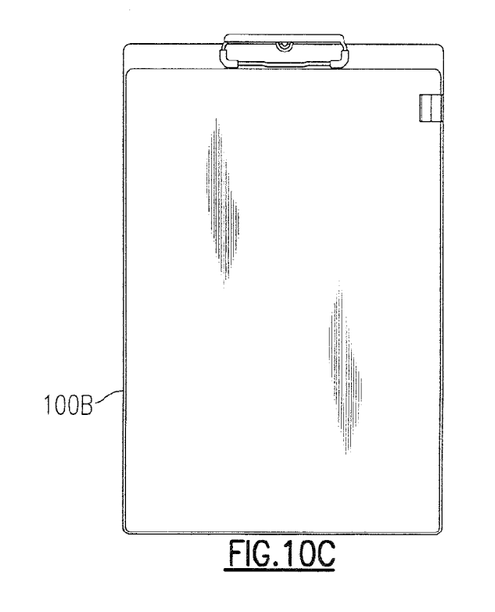
Figure 10D:
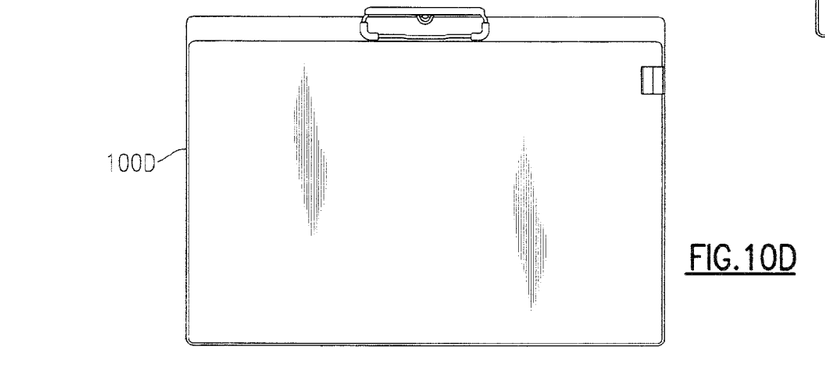

A spring-loaded clip 140, is fixedly attached to the top edge 113 of the base 104, the spring-loaded clip 140 including a support 141 that retains a top hinge 143 configured to bias an engagement member 144 into a closed position and with sufficient force to reliably secure a number of papers 194, FIG. 9, or similar materials thereto. One example of a suitable clip useful for these purposes is described in U.S. Pat. No. 5,658,014, the relevant portions being incorporated herein by reference. The support 141 includes a center attachment opening or hole 145 adjacent the top hinge 143, as well as a pair of spaced lower attachment holes 146 provided on either side of the center hole 145. According to this design, the hinge clip 140 is mounted in overlaying relation to the top edge 113 of the base 104 with the support 141 being disposed on the rear facing side 112 and within the recess 123 and the engagement member 144 being provided on the front facing side 108. Pairs of fastener members 190, such as plastic rivets or snap shanks, mechanically retain the hinge clip 140 to the plastic base 104 as discussed herein. A set of pads 147 made from a rubber, plastic or other compliant material are provided at the bottom of the hinged engagement member 144 to insure even contact.

Figure 8:
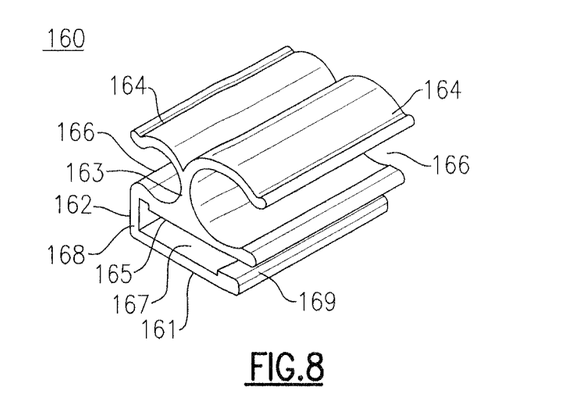
FIG. 8 is a side perspective view of a writing implement clip in accordance with an exemplary embodiment for attachment to the clipboard of FIGS. 1-7.

For purposes of this embodiment, a writing implement clip 160 is provided for mechanical attachment to the lateral edge 115 of the clipboard 100 and more specifically within the recess 125 that is specifically sized to receive the writing implement clip 160. Referring to FIG. 8, the writing implement clip 160 according to this exemplary embodiment is defined by a singular member 162 made from a flexible and durable plastic, such as Delrin. The clip 160 is defined by a bottom surface 161 and a parallel intermediate surface 165, the latter surface 165 supporting a pair of laterally extending clips 164 that are each defined by an engagement opening 166 extending into a substantially C-shaped enclosure that is separated by a common web 163. As shown herein, each clip 164 is configured to permit at least one dry-erase pen 170, FIG. 9, ball-point pen, mechanical pencil, marker pen or highlighter or other suitable writing implement to be snap-fitted into a secured position. The intermediate surface 165 and the bottom surface 161 further define a gapped area 167 that is further defined by a rear surface 168 interconnecting the intermediate surface 105 and bottom surface 161 and a distal engagement tab or protrusion 169 extending upwardly from the bottom surface 161. The gapped area 167 includes a recess 171 formed in the intermediate surface 105 directly adjacent the rear surface 168. According to this design, the intermediate surface 165 and bottom surface 161 can each be caused to deform elastically outward to increase the size of the gapped region 167 to allow the clip member 160 to be secured to the clipboard 100, as further discussed herein.

Referring to FIGS. 3-8, the assembly of the herein described clipboard 100 is sequentially described in greater detail. For purposes of these figures and though the front panel 130 actually covers the plurality of second recesses 120 of the front facing side 108 of the base 104, these recesses 120 are partially shown in the afore mentioned drawings in order to aid in providing an overall understanding of the present invention.

Figure 3:
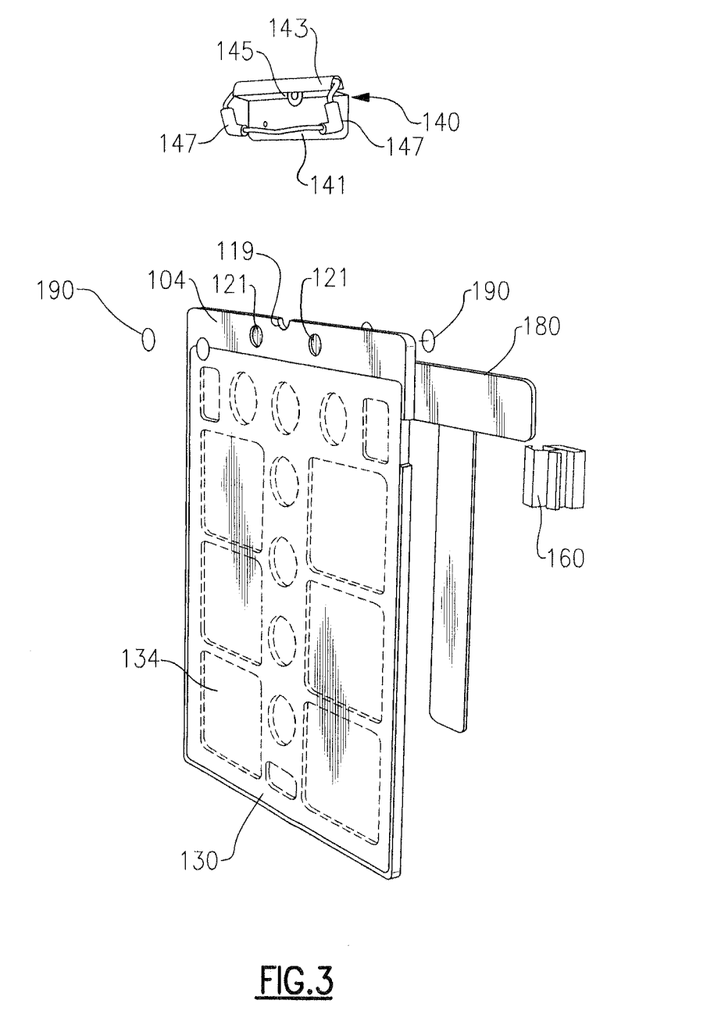
FIG. 3 is a partial assembly view of the clipboard of FIGS. 1 and 2, depicting the attachment of a dry erasable front surface.

First and as shown in FIG. 3, the base 104 and each of the parts of the clipboard assembly 100 are initially provided and in which the first and second recesses 116, 120 have already been formed in the front facing sides 108 of the base 104, as well as the openings 126 and 121 and the recesses 118, 123 and 125 provided on the front and/or back facing side 108, 112. According to this embodiment, the rear facing side 136, FIG. 1, of the front steel surface 130 is first attached to the base 104 within the defined first recess 116 using adhesives, although other means, such as fasteners, could also be utilized. When assembled and as shown in FIG. 9, the dry-erasable front side 134 of the front panel 130 is substantially flush or coplanar with the front facing surface 108 of the base 104.

Figure 4:
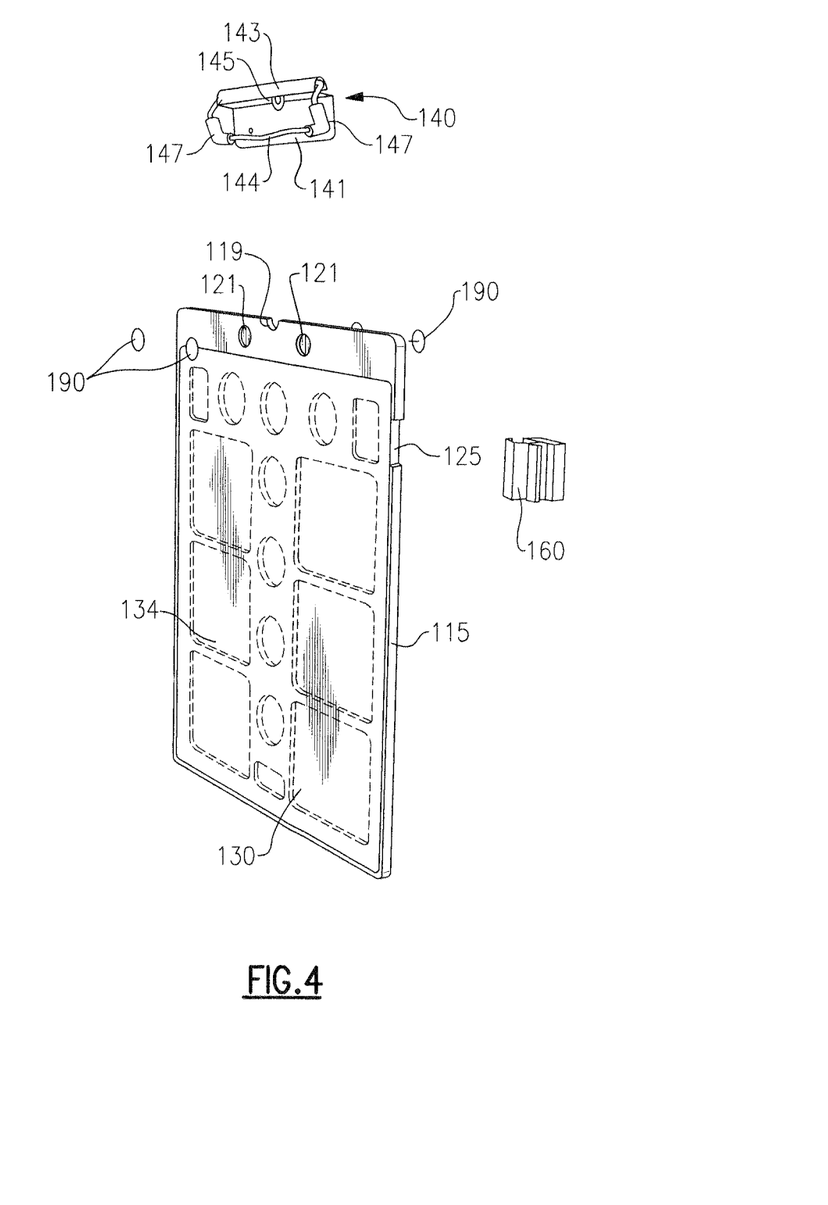
FIG. 4 is a partial assembly view of the clipboard of FIGS. 1-3, depicting the assembly of an exemplary magnet to the rear side thereof.

According to FIGS. 2-4, the substantially T-shaped magnet 180 is then attached and fitted by adhesives into the slotted recess 118, which is sized and configured to accommodate same in the rear facing side 112 of the base 104. It should be noted that according to this version, a plurality of magnets (not shown) can alternatively be used in lieu of a single component. Preferably, the magnet 180 when attached using an adhesive or other suitable means is fitted within the recess 118 such that an outwardly facing surface of the magnet 180 is substantially flush with or extends slightly (1/32") from the back facing side 112 of the base 104.

Figure 5:
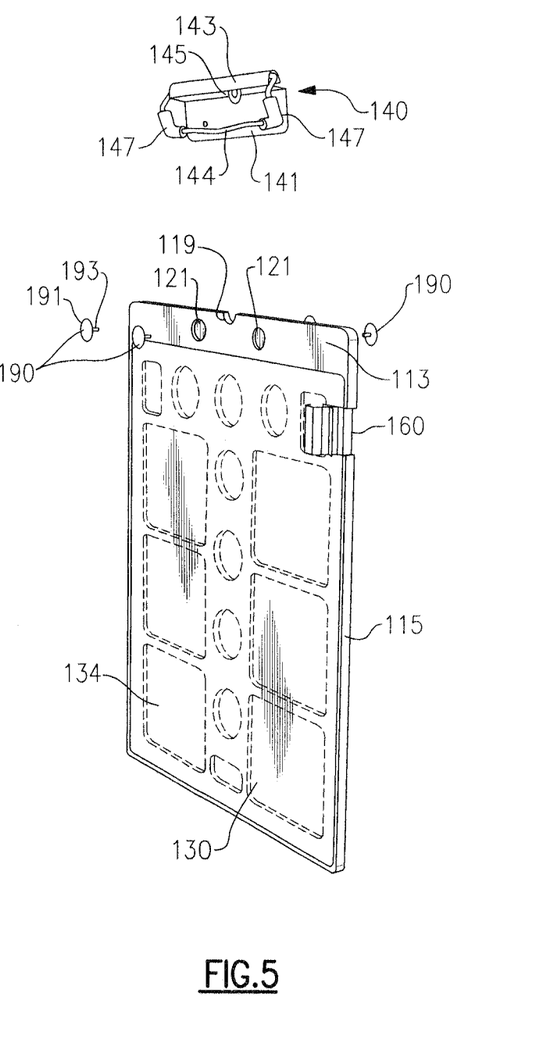
FIG. 5 is a partial assembly view of the clipboard of FIGS. 1-4, illustrating the attachment of an exemplary writing implement clip to a lateral side of the clipboard.
Figure 6:
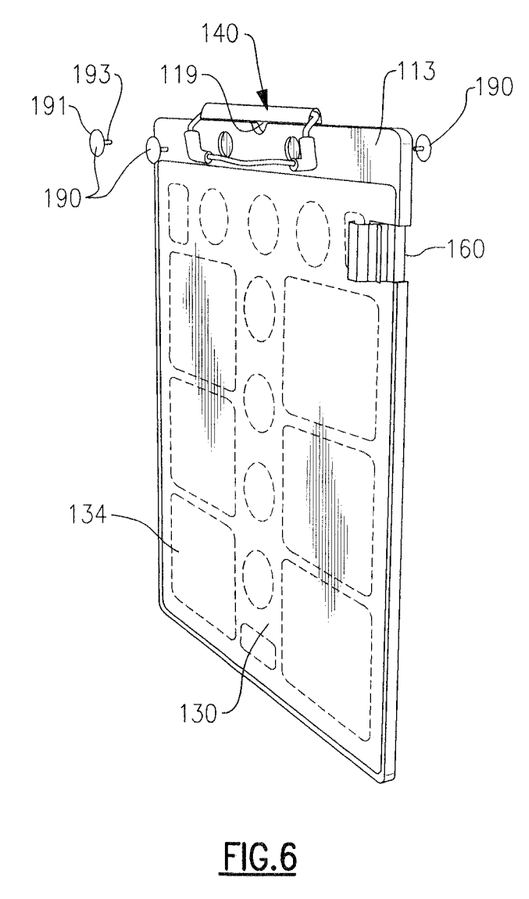
FIG. 6 is a partial assembly view of the clipboard of FIGS. 1-5, illustrating the attachment of an exemplary spring-loaded hinge clip to the upper end of the clipboard.

According to FIGS. 5 and 8, and after the steel panel 130 has been attached, the writing implement clip 160 is attached to the clipboard 100 and more specifically onto the recess 125 formed in the lateral edge 115 and the rear facing surface 112 of the base 104. The gapped region 167 of the clip 160 is initially smaller in width than the thickness of the assembled base 104, including the attached steel panel 130, and therefore the gapped region 167 must be elastically deformed to permit the clip 160 to be placed onto the base 104. An open side of the gapped region 167 is engaged against the lateral edge 115 of the base 104 and the bottom and intermediate surfaces 161, 165 of the clip 160 are elastically deformed. The clip 160 is advanced over the rear facing surface and front dry-erasable surface 138 of the assembled base 104 and advanced until the rear surface 168 of the clip 160 engages the lateral edge 115 of the base 104 with the recess 171 being made available for securement by an extending portion of the lateral edge 115 extending slightly outwardly from the front dry-erasable surface 138. The bottom and intermediate surfaces 161, 165 are biased toward each other within the recess 125 that is sized to accommodate the clip 160 and provide a snap fit wherein the engagement tab 169 engages the slot 129 formed in the recess 125. This fit retains the writing implement clip 160 securably, wherein the lateral edges 115 on the upper and lower side of the recess 125 constrain the clip 160 from lateral (up/down) movement. Additionally and according to this exemplary embodiment, a layer of adhesive (not shown) can be applied between the steel facing surface 138 and the top surface of the writing implement clip 160.

According to FIGS. 2-6, the exemplary hinge clip 140 can be attached to the top edge 113 of the base 104. As noted, the herein provided clip 140 is mounted in overlaying fashion to the base 104 with the support 141 being mounted within the recess 123 formed in the rear facing surface 112 of the base 104 and the engagement member 144 extending onto the top edge 113 at the front facing surface 108. When attached, the engagement member 144 of the hinge clip 140 is further configured to remain above the dry-erasable writing surface 138 so as not to interfere therewith.

Figure 7:
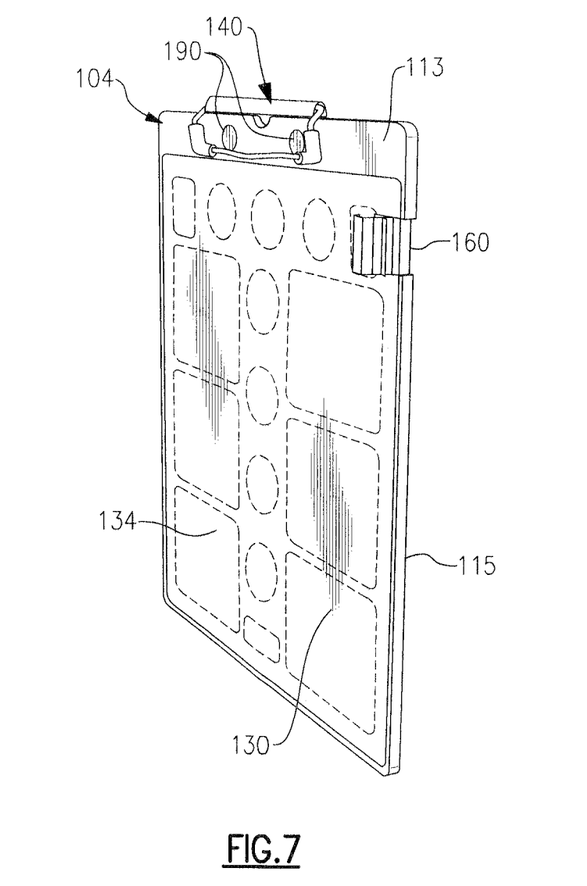
FIG. 7 depicts the partial assembly view of the clipboard of FIGS. 1-6, illustrating the securement of the hinge clip of FIG. 6 to the clipboard of FIGS. 1-6.

Finally and as shown in FIG. 7, the fastener members 190 provided at the rear and front surfaces 108, 112 of the base 104 are used to mechanically secure the hinge clip 140 in position. Each of the fastener members 190 according to this specific embodiment are defined by respective pairs of plastic rivets. A front fastener member 190 is defined by a head 191 and extending shank portion 193. The shank portion 193 of each of the front fastener members 190 is sized to be fitted through the hole 121 of the base 104 and the lower attachment openings 146 of the support 141 of the hinge clip 140, the shank portion 193 being retained by an opening (not shown) formed in a rear fastener member 190, the latter fastener member acting as the equivalent of a nut. Preferably, the front and rear fastener members 190 are sized such that the head portions are substantially flush or coplanar with the front and rear sides of the assembled clipboard 100.

An assembled clipboard 100 according to an exemplary embodiment is depicted according to FIG. 9 in a typical use condition. At least one magnet 192, 196 can be releasably attached to the dry-erasable writing surface 138 for securing paper 194 or other materials or for display purposes. Paper can also be retained using the hinge clip 140 in a conventional manner. The writing implement clip 160 can retain at least one writing implement 170 in each of the clips 164 by snap-fitting the implement through the slotted openings 166. In this version, neither of the clips 140, 160 interfere with access to the dry-erasable front surface 138 of the clipboard 100. The magnet 180 permits attachment of the clipboard 100 to planar metallic supporting surfaces (not shown), while the center attachment hole 145 combines with the notch 119 of the base 104 to provide an opening that permits attachment of the clipboard 100 to a non-metallic supporting surface (not shown), as needed. As such, the clipboard 100 can be used in literally any industrialized or other suitable setting.

As shown in FIGS. 10A-10D, the overall shape of the clipboard can easily be varied between clipboard 100 and versions 100A-100C, among others.

PARTS LIST FOR FIGS. 1-10

100 clipboard
100A clipboard
100B clipboard
100C clipboard
104 base or base member
108 front facing side or surface, base
112 rear facing side or surface, base
113 top edge
114 bottom edge
115 lateral or side edges
116 first recess, base
117 recessed or spaced section
118 T-shaped slot
119 notch
120 second plurality of recesses, base
121 holes
123 recess
125 recess
126 openings
127 recess
128 recess
129 slot
130 steel front surface
134 front facing side, front panel
136 rear facing side, front panel
138 dry-erasable writing surface
140 spring-loaded (hinge) clip
141 support
143 hinge
144 engagement member, hinge clip
145 attachment opening, center
146 attachment openings
147 pads, hinge clip
160 writing implement clip
161 bottom surface
162 member
163 web
164 support, writing implement clip
165 intermediate surface
166 slotted openings, writing implement clip
167 gapped region
168 rear surface
169 engagement tab
170 writing implement
171 recess
180 magnet, T-shaped
190 fastener members
191 head
192 magnets
193 shank portion
194 paper
196 magnets It will be readily apparent that other variations and modifications are possible within the intended spirit and scope of this invention.

The invention claimed is:

1. A clipboard comprising:
a planar support made entirely from a plastic molded material, the planar support having a front facing side and an opposing rear facing side;
a steel panel secured to the front facing side of the planar support, the steel panel having a dry-erasable front surface defined by a treated coating that enables writing by dry-erasable pens and erasure therefrom;
a hinge clip attached to the front facing side of said planar support, the hinge clip enabling at least one paper to be secured thereto; and
wherein the dry-erasable front surface is configured for adhesion by at least one item retaining magnet, and in which the majority of the front facing side of the planar support includes a first formed recess having dimensions corresponding to those of the steel panel to allow the steel panel to be disposed therein and further enabling the dry-erasable surface to be substantially coplanar with a front surface of the planar support, the front facing side of the planar support further including a plurality of second recesses additionally formed within the first formed recess.

2. The clipboard according to claim 1, further including at least one clip member configured for storing at least one writing implement.

3. The clipboard according to claim 2, wherein the at least one clip member is made from a resilient plastic and includes at least one C-shaped portion having an engagement opening that flexibly expands to accept and engage a writing implement.

4. The clipboard according to claim 3, wherein the clip member includes a web portion and a pair of the clip portions disposed on opposite sides of the web portion.

5. The clipboard according to claim 1, including a supporting magnet attached to the rear facing side of the planar support, the supporting magnet having a substantially T-shaped configuration.

6. The clipboard according to claim 5, wherein the rear facing side of the planar support includes a slot sized to permit the substantially T-shaped supporting magnet to be fitted therewith.

7. The clipboard according to claim 1, including a plurality of through openings formed in the planar support.

8. The clipboard according to claim 7, wherein the openings are arranged within the first formed recess of the planar support.

9. The clipboard according to claim 1, wherein the hinge clip is spring-loaded.

10. The clipboard according to claim 1, including at least one attachment hole that enables said clipboard to be attached to a non-metallic supporting surface using at least one fastener.

11. A clipboard comprising:
a plastic molded planar support;
steel panel attached to a front facing side of the planar support, the steel panel having a front dry-erasable surface defined by a treated coating that permits writing thereon using dry-erase pens, and in which the dry-erasable permits adhesion of at least one article thereto using at least one item retaining magnet in which the steel panel is secured to the planar support within a first recess formed in the planar support, enabling the dry-erasable surface to be substantially coplanar with the front surface of the planar support and in which a plurality of second recesses are formed in the first recess of the planar support.

12. The clipboard according to claim 11, wherein a rear side of the planar support includes at least one recess sized for retaining at least one supporting magnet that is secured to the rear facing side of the planar support.

13. The clipboard according to claim 12, wherein said at least one recess in the rear side of the planar support is a substantially T-shaped slot.

14. The clipboard according to claim 13, wherein the at least one supporting magnet is secured in the substantially T-shaped slot.

15. The clipboard according to claim 13, including at least one writing implement clip disposed on said planar support.

16. The clipboard according to claim 15, wherein the implement clip includes a web portion and a pair of the clip portions disposed on opposite sides of the web portion.

17. The clipboard according to claim 11, including at least one attachment hole to enable said clipboard to be attached to an non-metallic supporting surface.

\* \* \* \* \*

UNITED STATES PATENT AND TRADEMARK OFFICE
CERTIFICATE OF CORRECTION

PATENT NO.         : 9,168,779 B2
APPLICATION NO.    : 13/956772
DATED              : October 27, 2015
INVENTOR(S)        : Christian Q. Krapf et al.

It is certified that error appears in the above-identified patent and that said Letters Patent is hereby corrected as shown below:

On the Title Page

<u>Item (71) Applicants:</u>
Change "INTELPROPOLIST LLC, Macedon, NY (US)" to --W.A. KRAPF, INC., Macedon NY (US)--

In the Claims

Claim 11:
Column 8
Line 56, please change "steel panel attached to a front facing side of the planar" to --a steel panel attached to a front facing side of the planar--

Claim 11:
Column 8
Line 60, please change "erasable permits adhesion of at least one article thereto" to --erasable surface permits adhesion of at least one article thereto--

Signed and Sealed this
Twentieth Day of August, 2019

Andrei Iancu
*Director of the United States Patent and Trademark Office*